Nov. 25, 1947.   A. H. REEVES   2,431,344
DETERMINING DISTANCE BY ELECTROMAGNETIC WAVES
Filed Feb. 22, 1944
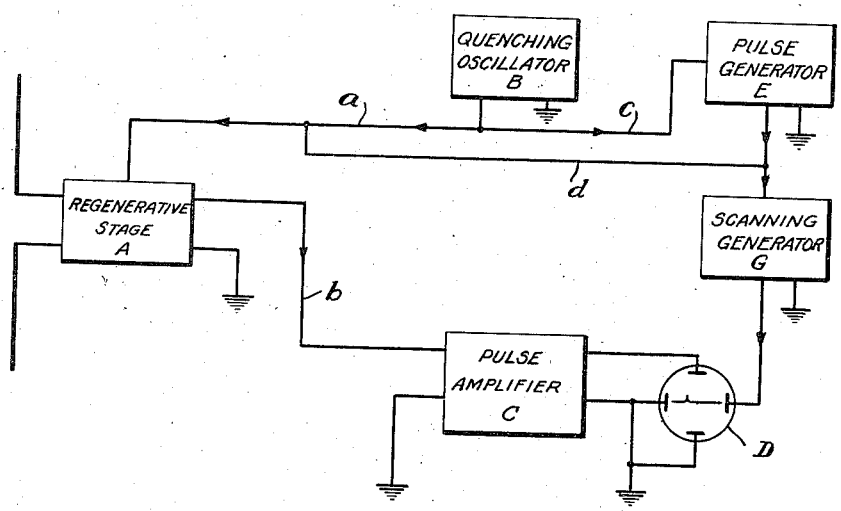
INVENTOR.
ALEC HARLEY REEVES
BY
ATTORNEY.

Patented Nov. 25, 1947

2,431,344

UNITED STATES PATENT OFFICE 2,431,344

DETERMINING DISTANCE BY ELECTROMAGNETIC WAVES

Alec Harley Reeves, London, England, assignor to International Standard Electric Corporation, New York, N. Y.

Application February 22, 1944, Serial No. 523,397
In France May 20, 1940

3 Claims. (Cl. 250—1.66)

The present invention relates to arrangements utilising the reflection of electromagnetic waves for detecting objects and determining the distance of said objects for example, aircraft, either from the ground or from another aircraft, or in general from a location from which the electromagnetic waves are radiated and received after reflection.

Systems of the type specified utilising electrical pulses are known.

An object of the present invention, is to provide arrangements of the type specified utilising the transmission and reception of electrical pulses in which antenna devices and high frequency circuits may be used in common for transmission and reception.

According to this invention a system of the type specified comprises a super-regenerative receiver, an indicator in the output of said receiver, a pulse generator, means for applying generated pulses from said generator to said super-regenerative receiver, the amplitude of said generated pulses being sufficiently high to cause said super-regenerative receiver to oscillate, whereby radio frequency pulses are generated and means for transmitting said radio frequency pulses and receiving the transmitted pulses after reflection. The quenching oscillator of the receiver may serve to synchronise a relaxation oscillator to a sub-multiple frequency, equal, for example, to one fiftieth of the quenching frequency, the relaxation oscillator being arranged to give in its output short pulses. These pulses are of such amplitude that when applied to the super-regenerative receiver, this latter does not operate as a receiver but as a transmitter power amplifier, the amplified pulse being fed to an antenna for radiation. The pulse reflected by the obstacle or aircraft arrives back at the antenna during one of the 49 other periods of the quenching oscillator during which the receiver operates as a super-regenerative receiver, and the pulse in the receiver output is used to produce on a cathode ray oscillograph an indication corresponding to the time the pulse has taken to travel to and from the obstacle.

A better understanding of the invention will be had from the following description of an embodiment of the invention given with reference to the single figure of the accompanying drawing.

The device of the invention may use, for example, 50-centimeter waves, i. e. 600 megacycles per second, and the auxiliary quenching frequency of the super-regenerative system may be fixed at 1 megacycle.

In the figure, A represents the regenerative stage of the super-regenerative receiver tuned to the carrier fequency; for example, 600 megacycles.

Instead of the usual low frequency output circuit, a resistance coupled amplifier indicated by the block rectangle C is provided for bringing the level of the received waves to a value sufficient to act upon the deflection plates of a cathode ray oscillograph D.

The quenching frequency, of 1 megacycle, for example, is supplied by oscillator indicated by rectangle B over connection $a$; the assembly comprising oscillator A and quenching oscillator B thus operates as a super-regenerative receiver.

Pulse amplifier C is connected to the output of A by wire $b$, and when A operates as a receiver it transmits the reflected pulses in the usual manner to cathode ray oscillograph D. The amplifier C operates at the quenching frequency and also may rectify the received pulse trains of carrier frequency before application to oscillograph D.

The pulses to be transmitted are produced by pulse generator indicated by rectangle E, which is tuned by means of a suitable device to a frequency that is a sub-multiple of that of quenching oscillator B. Energy from quenching oscillator B is applied over line $c$ to generator E to maintain synchronism. If this frequency of generator E be equal to the one-fiftieth of the quenching frequency, which, in the example chosen, is 1 megacycle, pulse generator E will operate at 20,000 pulses per second. The duration of the pulses may be 1 microsecond and of sufficient amplitude to cause a substantial power emission, since it is possible to use high overload coefficient tubes for emissions of such short duration.

One of these pulses will thus be produced during every 50 periods of the quenching frequency, their amplitude being such that when applied to regenerative stage A the system does not operate as a super-regenerative receiver, as it does during the other 49 periods. These applied pulses are of great enough amplitude to permit stage A to build up to oscillation despite the application of quenching oscillations from B. Thus, an energy pulse of 600 megacycles per second frequency is transmitted every 50 periods of the quenching frequency. This high frequency pulse will not pass amplifier C which operates at a lower frequency and thus will not be applied to oscillograph D.

Pulses from pulse generator E are also applied to scanning wave generator G which serves to produce a sweep frequency wave to control the sweep of oscillograph D. This sweep is preferably controlled so that it will commence at the time of transmission of pulses from E. Thus, the reflected pulse upon reception will produce an indication along the sweep characteristic of the distance of the reflecting object.

If an aircraft to be detected is at a distance of 150 meters, for example, the go and return time of the transmitted pulses will be precisely 1 microsecond, and the reflected wave will arrive exactly one period of the quenching frequency after its transmission. Under these conditions, it will be received during this second period and there will appear on oscillograph D a vertical line at a point representing $1/50$ of the transmission period characterising the distance of the aircraft.

If the distance of the aircraft to be detected is doubled, the second and not the first quenching period will receive the echo. In fact, regardless of the distance of the aircraft, there always will be a reflected pulse portion that will be received during a certain period of the quenching oscillator, and the position of the aircraft will be given in the usual manner by observing the position of the pulse indication on the screen of the cathode ray oscillograph.

In the particular example described, the pulse repetition frequency of the transmitted pulses of 20 kilocycles per second will allow detection of aircraft up to a maximum distance of 7.5 kilometres.

If desired, the circuit may be arranged so that an indication may be given only when an aircraft reaches a certain critical distance, for example, the distance at which gun firing becomes effective. This can be achieved by controlling the sweep circuit constants in such a way that indications will be given only from this critical distance.

In practice, it will probably be useful to have a logarithmic graduation of the oscillograph allowing the spacing of graduations for short distances, generally that one which is more useful to know with precision. This may be accomplished by having the sweep voltage follow a logarithmic law with time instead of a linear law as is commonly used.

Furthermore, the devices described may be combined with a multiple antenna system that allows of direction indications being obtained at the same time as distance indications.

The signal-to-noise ratio may be improved by giving the amplifier characteristics providing amplification of the uniformly timed pulses but not of the random static or noises occurring in between the pulses. This may be achieved according to known methods, such as the use of a line short-circuited at one end and arranged so as to produce a reinforcing effect on the pulses arriving at the correct repetition frequency.

The equipment comprising the antenna and high frequency circuits described, result in a substantial reduction in the space and weight of the apparatus over equipment hitherto used. This is a distinct advantage, particularly in the case of aircraft, where the equipment may serve to detect other aircraft or to determine altitude.

While the invention has been described with reference to one embodiment given by way of example, it will be understood that it is in no way limited thereby, and that it is capable of numerous modifications and adaptations without departing from the scope thereof as defined in the appended claims.

What is claimed is:

1. Arrangements for determining distance to a reflecting object by reflection of transmitted pulses from said object, comprising a super-regenerative receiver including a regenerative stage, a quenching oscillator coupled to said regenerative stage, an indicator coupled to the output of said regenerative stage, a pulse generator operated at a submultiple frequency of said quenching oscillator in response to energy therefrom, means controlled by said pulse generator for controlling said indicator to produce a displacement in time of indications thereon, means for applying pulses from said pulse generator to said regenerative stage for causing oscillation thereof despite said quenching oscillations and means for transmitting pulses produced by said oscillation and receiving said pulses after reflection from said object.

2. Arrangements for determining distance to a reflecting object by reflection of transmitted pulses from said object, comprising a super-regenerative receiver for receiving said reflected pulses comprising a regenerative stage tuned to a predetermined frequency, a quenching oscillator tuned to a subharmonic of said predetermined frequency coupled to said regenerative stage, and an amplifier tuned to the frequency of said quenching oscillator coupled to the output of said regenerative stage, a cathode ray oscillograph having two sets of deflecting electrodes, a scanning wave generator, means for applying the output of said amplifier to one set of said deflecting electrodes and the output of said scanning generator to the other set of said deflecting electrodes, a pulse generator for generating pulses at a repetition frequency which is a sub-multiple of said quenching frequency, said pulses having an amplitude substantially greater than the amplitude of oscillations from said quenching oscillator, means for applying said generated pulses to said regenerative stage to cause oscillation thereof, and means for synchronising said scanning generator under control of said generated pulses.

3. Arrangements according to claim 2 further comprising means for coupling said quenching oscillator to said pulse generator to synchronise the pulse repetition frequency with said quenching oscillator.

ALEC HARLEY REEVES.

REFERENCES CITED

The following references are of record in the file of this patent:

UNITED STATES PATENTS

| Number | Name | Date |
|---|---|---|
| 1,833,788 | McLamore | Nov. 24, 1931 |

FOREIGN PATENTS

| Number | Country | Date |
|---|---|---|
| 108,556 | Australia | Sept. 14, 1939 |